US009756039B2

(12) United States Patent
Shmulevich

(10) Patent No.: US 9,756,039 B2
(45) Date of Patent: *Sep. 5, 2017

(54) DOCUMENT RENDERING SERVICE

(71) Applicant: salesforce.com, inc., San Francisco, CA (US)

(72) Inventor: Igor A. Shmulevich, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,544

(22) Filed: Sep. 14, 2016

(65) Prior Publication Data

US 2017/0118193 A1    Apr. 27, 2017

Related U.S. Application Data

(63) Continuation of application No. 14/324,827, filed on Jul. 7, 2014, now Pat. No. 9,467,434.
(Continued)

(51) Int. Cl.
*H04L 29/06* (2006.01)
*G06F 17/22* (2006.01)
*G06F 17/30* (2006.01)

(52) U.S. Cl.
CPC ........ *H04L 63/083* (2013.01); *G06F 17/2247* (2013.01); *G06F 17/30896* (2013.01)

(58) Field of Classification Search
CPC .............. H04L 63/083; G06F 17/2247; G06F 17/30896
(Continued)

(56) References Cited

U.S. PATENT DOCUMENTS 5,577,188 A    11/1996  Zhu
5,608,872 A    3/1997   Schwartz et al.
(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.
(Continued)

*Primary Examiner* — Michael S McNally
(74) *Attorney, Agent, or Firm* — Weaver Austin Villeneuve & Sampson LLP

(57) ABSTRACT

Disclosed are some examples of systems, methods and storage media for generating a platform-independent document. In some implementations, a system is capable of receiving a request to generate a platform-independent document, the request including markup language content. The system is further capable of providing the markup language content to a rendering engine. The system is further capable of intercepting resource requests communicated from the rendering engine. The system is further capable of communicating the intercepted requests, or one or more requests based on the intercepted requests, to retrieve resources identified in the intercepted requests. The system is further capable of receiving resources retrieved based on the communicated intercepted requests. The system is further capable of providing the retrieved resources to the rendering engine, which subsequently renders the platform-independent document based on the markup language content and the retrieved resources.

20 Claims, 6 Drawing Sheets

Related U.S. Application Data

(60) Provisional application No. 61/846,390, filed on Jul. 15, 2013.

(58) Field of Classification Search
USPC .................................................. 726/9
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,515,615 B2 * | 4/2009 | Peeters ............... H04J 13/00 370/515 |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,588,426 B2 * | 11/2013 | Xin ..................... H04L 9/002 380/252 |
| 8,646,103 B2 | 2/2014 | Jakobson et al. |
| 8,856,869 B1 * | 10/2014 | Brinskelle ............ H04L 63/08 726/12 |
| 2001/0044791 A1 | 11/2001 | Richter et al. |
| 2002/0072951 A1 | 6/2002 | Lee et al. |
| 2002/0082857 A1 * | 6/2002 | Skordin ............... G06F 17/243 705/1.1 |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0181708 A1 * | 12/2002 | Seo ..................... H04L 9/0662 380/252 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |

(56) References Cited

U.S. PATENT DOCUMENTS

| | | |
|---|---|---|
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0254091 A1* | 11/2005 | Cranitch ............ H04N 1/00233 358/1.18 |
| 2007/0250497 A1* | 10/2007 | Mansfield ......... G06F 17/30731 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0274922 A1* | 10/2010 | Reavely ................. H04L 67/14 709/238 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0205401 A1* | 8/2013 | Lin ......................... G06F 21/10 726/26 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0137184 A1* | 5/2014 | Russello ................ G06F 21/60 726/1 |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0020177 A1 | 1/2015 | Shmulevich |
| 2015/0088984 A1 | 3/2015 | Liang et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

US Office Action dated Oct. 29, 2015 in U.S. Appl. No. 14/324,827.
US Final Office Action dated Apr. 29, 2016 in U.S. Appl. No. 14/324,827.
US Notice of Allowance dated Jun. 14, 2016 in U.S. Appl. No. 14/324,827.
Barth, Adam, "How WebKit Works," Oct. 30, 2012, Webkit. 16 pages.

* cited by examiner

DOCUMENT RENDERING SERVICE

PRIORITY DATA

This patent document is a continuation of U.S. patent application Ser. No. 14/324,827 titled DOCUMENT RENDERING SERVICE by Shmulevich and filed on 7 Jul. 2014, which claims the benefit of priority under 35 U.S.C. 119(e) to U.S. Provisional Patent Application Ser. No. 61/846,390 titled DOCUMENT FORMAT RENDERING SERVICE by Shmulevich and filed on 15 Jul. 2013, both of which applications are hereby incorporated by reference herein in their entireties and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

This patent document relates generally to document generation and rendering, and more specifically, to cloud computing services for providing platform-independent documents.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems.

Part of the applications or on-demand services provided to end-users may include the ability for a user to create, modify, or view documents and other files. For example, a user can prepare a document using services provided by a cloud computing system via the user's web browser. A user who has prepared a document using an interface rendered by a browser may desire to print the document. For example, the user may desire to print a physical copy of the document on paper or some other physical medium. Alternatively, the user may desire to print or "save" the document to a digital file format. While the user can typically print the document using the web browser's print function, different web browsers render markup languages, style sheet languages, dynamic programming languages, conventions and various document or file formats in different manners.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
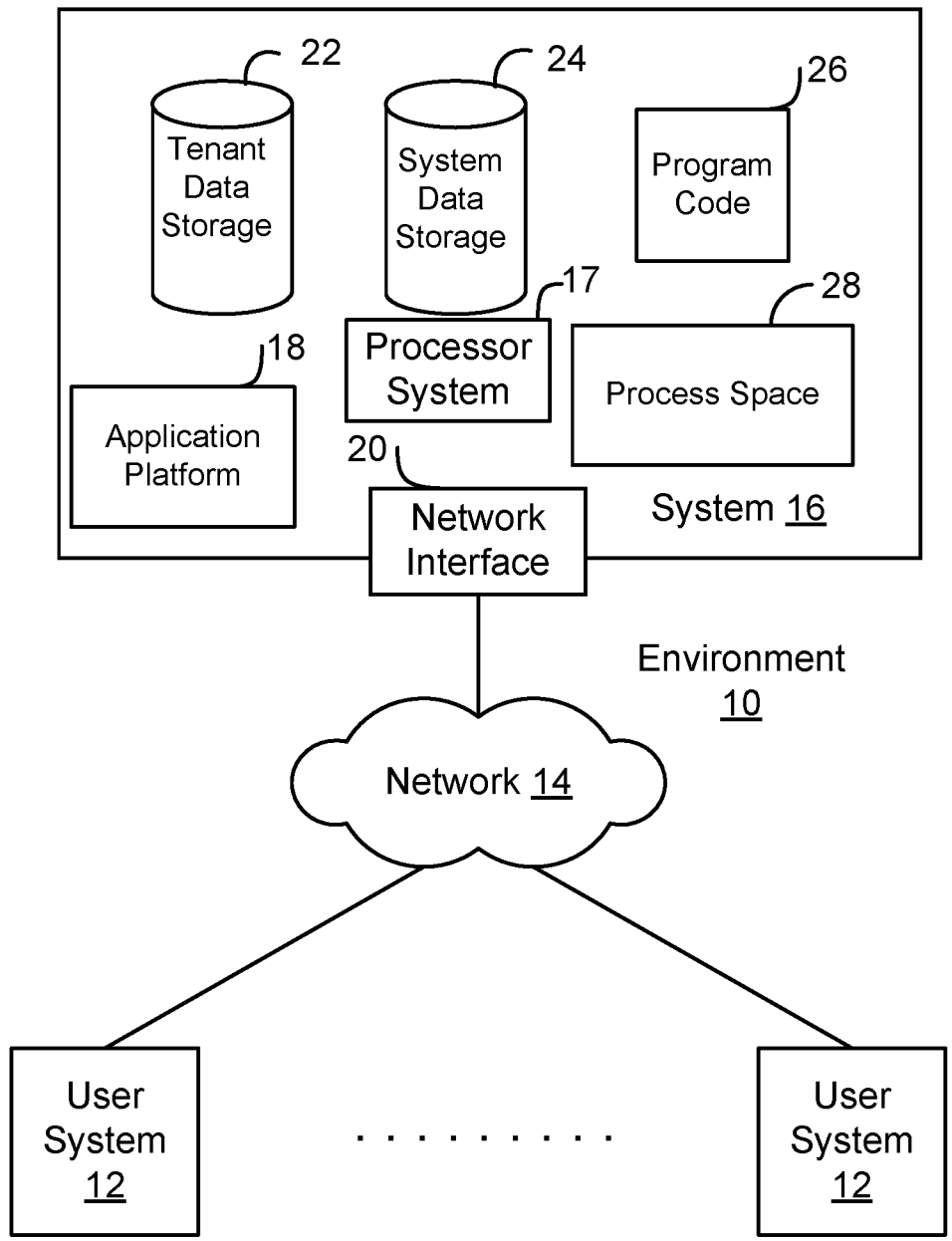
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for generating and providing "portable" or "platform-independent" versions of documents to a user. In some implementations, systems, apparatus, computer-implemented methods and computer-readable storage described herein implement a cloud-based system (or "architecture" or "environment") that provides applications or on-demand services to users (also referred to herein as "clients" of the system) upon request. Some of the applications or on-demand services provided to the users by the cloud-based system include the abilities for users to access, view/review, create, modify, upload and download documents and files including, for example, contracts, proposals, offers, acceptances, invoices, budgets, quotes, letters, reports, etc. (all of which documents and files may be referred to generally hereinafter as "documents"). For example, the cloud-based system can enable a user to access, view and modify a document generated by the system in response to user input or a user selection.

In some implementations, the document is first provided to the user in a first file format that allows the user to view and modify the document. For example, one or more servers performing various operations or functions to carry out the services provided by the cloud-based system can generate an electronic structured document, such as a markup language-based structured document, that includes markup language code for rendering the document. To avoid confusion between the markup language-based electronic structured documents generated and transmitted by the system servers and the personal or enterprise-related documents that are delivered to the end-users for rendering by way of such structured documents, "structured documents" are referred to hereinafter as "renderable web documents," while personal or enterprise-related documents (for example, contracts, invoices, reports or other documents containing information for the user or another user) that are displayed after rendering may be referred to simply as "rendered documents").

The system can transmit a renderable web document via one or more wired or wireless networks or network connections to the user's computing device. In some implementations, the renderable web document generated by the system and transmitted to the user's computing device can generally include a combination of one or more of markup language instructions, style sheets, other programming languages or scripts, or models, as well as content or resource locators used to identify and retrieve content from one or more locations internal or external to the system. A web browser or other client-side rendering application executing in the user's computing device renders the received renderable web document for display on the user's computing device as a rendered document. In some implementations, the system enables the user to interact with one or more applications or services provided by the system to access or modify the rendered document.

In some implementations, after a user has finished creating, modifying, viewing or otherwise accessing the rendered document, the user can select to cause the system to save the rendered version of the document into a printable format or otherwise select to cause the system to generate a printable version of the rendered document. While the user may be able to print the rendered document using the client-side web browser's print function, this can in some instances result in undesirable distortion of the document as a result of differences in how different web browsers render HTML or other markup languages, style sheet languages, dynamic programming languages, conventions and various document or file formats. In particular implementations, rather than the user printing or converting the format of the rendered document with a client-side application, such as a client-side web browser, the could-based system generates a printable version of the document that is "portable" or "platform-independent," in the sense that the printable version of the document, when printed, displayed or transmitted for display to another user, will appear the same regardless of the web browser or other rendering engine, operating system or hardware of the originating user's computing device or the other user's computing device (or at least for a majority of the web browsers, other rendering engines, operating systems and hardware generally available to the public).

In some implementations, the cloud-based system generates the printable version of the document (also referred to hereinafter as a "platform-independent document") as a Portable Document Format (PDF) file. By way of background, "printing" a document to a PDF file results in a conversion of the original (or current) document format into a PDF format. In some such implementations, the platform-independent document can advantageously be a searchable PDF document. PDF documents also can be desirable for other reasons such as, for example, because PDF documents are typically legally-acceptable and offer various security features, such as the ability to secure and protect the document with a password. However, in some other implementations, the cloud-based system can generate the platform-independent document in a different second format. For example, the system can generate the platform-independent document as an image file, such as a Portable Network Graphics (.png) file or other bitmap image file, among other possibilities.

As just described, in some instances, the user may desire to print a physical copy of the platform-independent document on paper or some other physical medium. Alternatively, the user may desire to print/save the finalized rendered version of the document into a platform-independent document having another second file format that can be sent to another user, archived, or otherwise shared or stored securely and reliably. For example, the user may desire to send the platform-independent document via an enterprise social network. One example of an online enterprise social network is CHATTER®, provided by salesforce.com, inc. of San Francisco, Calif. The user also may desire to send the platform-independent document via email or some other form of electronic communication. The user also can save the platform-independent document to the user's hard drive or to another memory location or device, such as a Flash drive, memory stick, memory card, or other portable memory device.

In one example use case, a user of the cloud-based system desires to send a billing invoice to a customer. In such a use case, the cloud-based system can enable the user to track the user's (or the respective organization's) sales and other business- or customer-related data. In some implementations, the could-based system provides a user interface to the user that displays such sales and other data in a consolidated form. Again, the system can provide the user interface by generating and transmitting a renderable web document to the user's computing device whereupon the web browser executing within the user's computing system parses the markup language code (for example, HTML), requests resources identified in the markup language code, and renders the user interface. In some implementations, the system can be configured to cause the user interface to display a selectable invoice for recent sales to a particular customer (or for sales made or processed during a specified time period), or to display a picklist that includes a set of selectable invoices for various customers and time periods. The user can then select an invoice by clicking on a user interface (UI) element such as a tab, button or other user-selectable element on the displayed interface. In response to the user selection of the invoice, the system generates and transmits HTML or other code to the user's computing device for rendering and displaying the invoice. This allows the user to view/review the selected invoice and make any changes if desired. In some implementations, the user can then select to create a printable version of the invoice (a platform-independent document) by clicking or selecting a "print" UI element displayed in the interface that displays the invoice. In response to the user's action, the user's computing device sends a request to the cloud-based system. The cloud-based system then generates and transmits to the user's computing device a printable platform-independent version of the invoice in the form of, for example, a PDF document. The user can then print a physical copy of the printable version of the invoice, save the printable version of the invoice in the user's computing device's hard drive or other storage media, or email or otherwise send or share the printable version of the invoice to or with another user within an enterprise social network or to a person outside a social network, such as a customer of the user's organization.

As mentioned above, in some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. Again, one example of an online enterprise social network is CHATTER®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Thus, the disclosed techniques can be implemented without having to install software locally, that is, on computing devices of users interacting with services available through the cloud. While the disclosed implementations may be described with reference to CHATTER® and more generally to enterprise social networking, those of ordinary skill in the art should understand that the disclosed techniques are neither limited to CHATTER® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant data storage 22 for storing tenant data 23, system data storage 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant data storage 22. In some such implementations, tenant data is arranged in the storage medium(s) of tenant data storage 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop personal computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The term "computing device" also is used interchangeably herein simply as a "computer". As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in, that can be executed by or used to program a server or other computing device to perform the methods of the implementations described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a client system or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
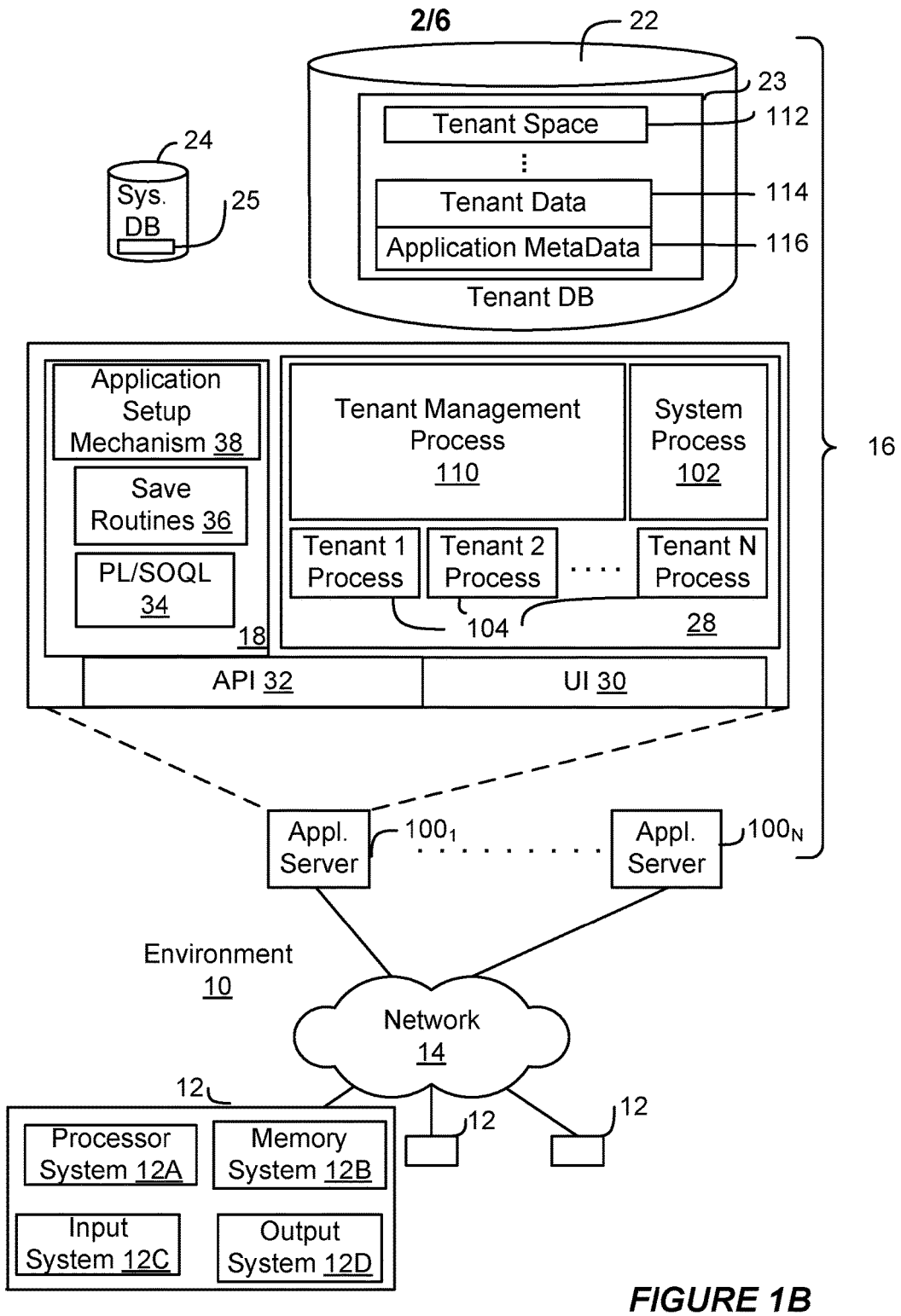
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant data storage 22 and the tenant data 23 therein, as well as system data storage 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant data storage 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant data storage 22 and system data storage 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant data storage 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be separate from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which can be client systems) communicate with the application servers 100 to request and update system-level and tenant-level data from the system 16. Such requests and updates can involve sending one or more queries to tenant data storage 22 or system data storage 24. The system 16 (for example, an application server 100 in the system 16) can automatically generate one or more SQL statements (for example, one or more SQL queries) designed to access the desired information. System data storage 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
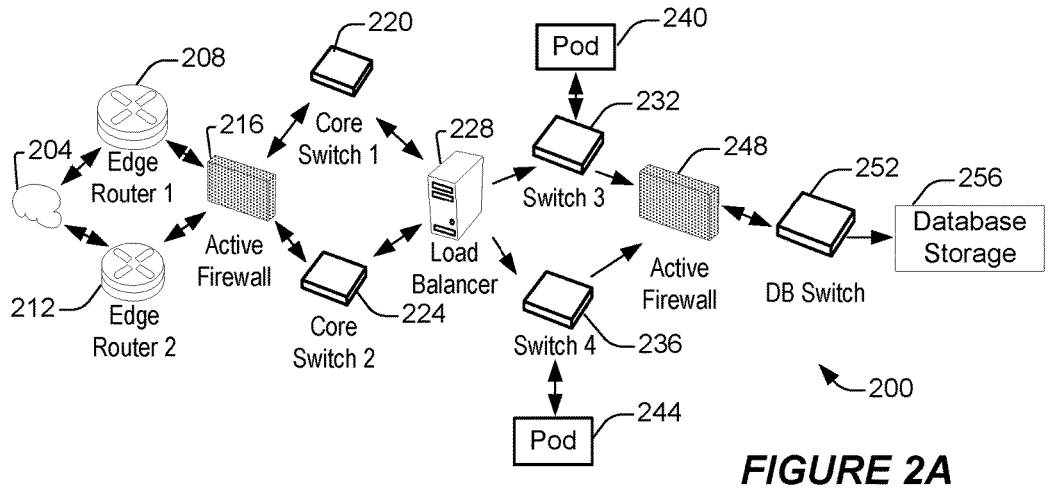
FIG. 2A shows a system diagram of example architectural components of an on-demand database service environment according to some implementations.

FIG. 2A shows a system diagram illustrating example architectural components of an on-demand database service environment 200 according to some implementations. A client machine located in the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
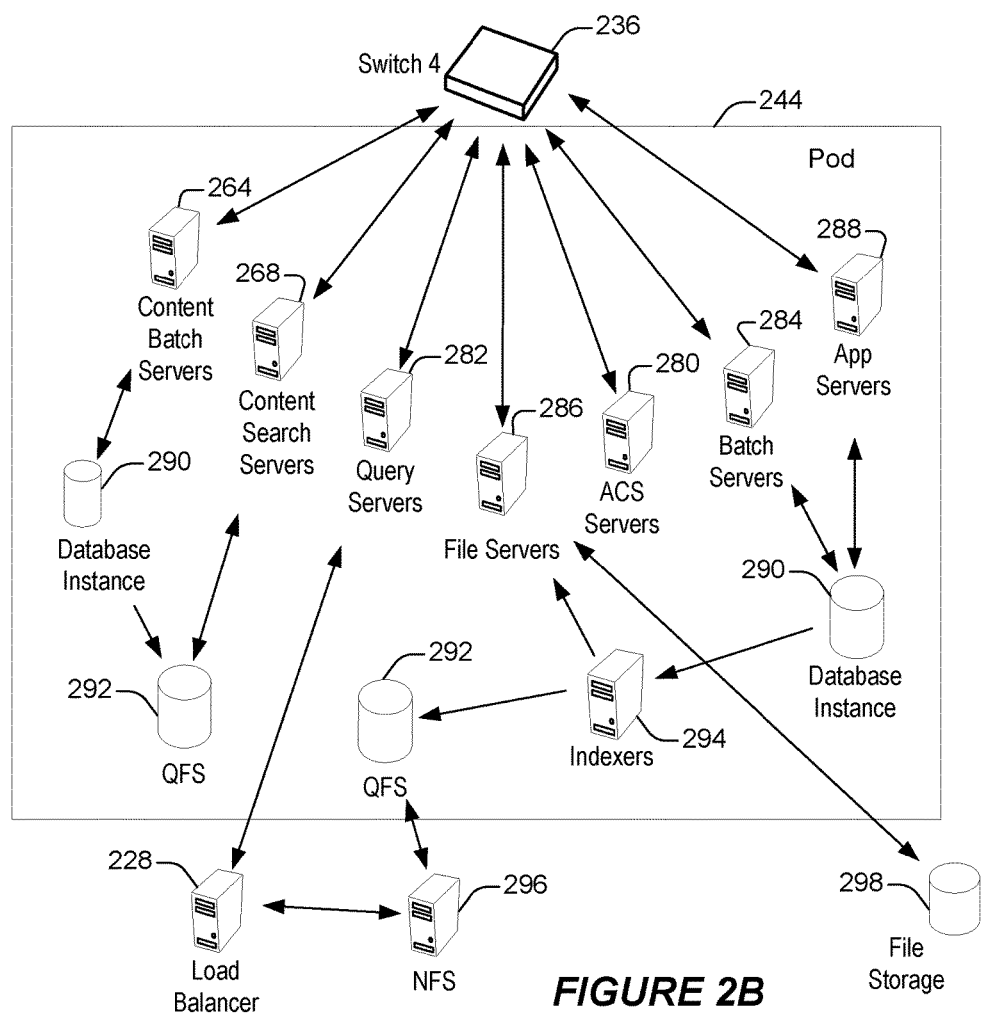
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines located in the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines located in the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file force servers 286 can manage requests for information stored in the Fileforce storage 298. The Fileforce storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

II. Document Rendering Service

Figure 3:
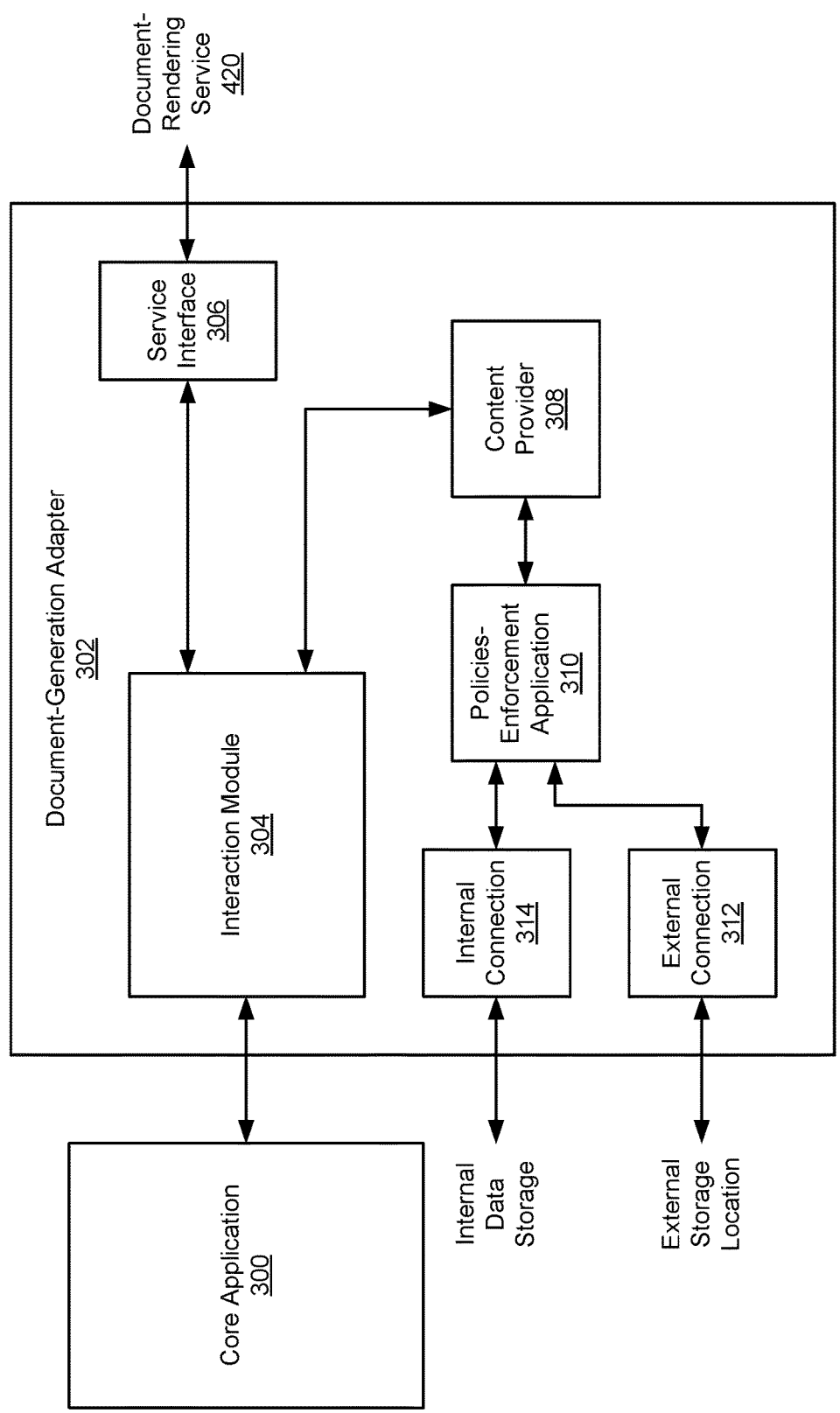
FIG. 3 shows a block diagram of an example of a document-generation adapter for receiving requests for, and providing, platform-independent documents to users of a cloud-based system according to some implementations.

As described above, in some implementations, the database system 16 includes application servers $100_1$-$100_N$. In some implementations, one or more of the application servers $100_1$-$100_N$ implement or host a core application that is the primary or master application for providing various on-demand or cloud-computing services described herein. One or more of the application servers $100_1$-$100_N$ also implement or host a document-generation adapter. In some implementations, the core application includes the document-generation adapter; that is, the document-generation adapter executes within the core application. FIG. 3 shows a block diagram of an example of a document-generation adapter 302 for receiving requests for, and providing, platform-independent documents to users of a cloud-based system according to some implementations. For example, the cloud-based system can include or be a part of the database system 16 described with reference to FIGS. 1A and 1B.

In the illustrated implementation, the document-generation adapter 302 is in communication with a core application 300 that provides various on-demand or cloud-computing services including document generation services as well as, in some implementations, other on-demand services including, for example, CRM services. The document-generation adapter 302 includes an interaction manager 304, a service interface 306, a content provider 308, a policies-enforcement application 310, an internal network connection 312 and an external network connection 314.

Figure 4:
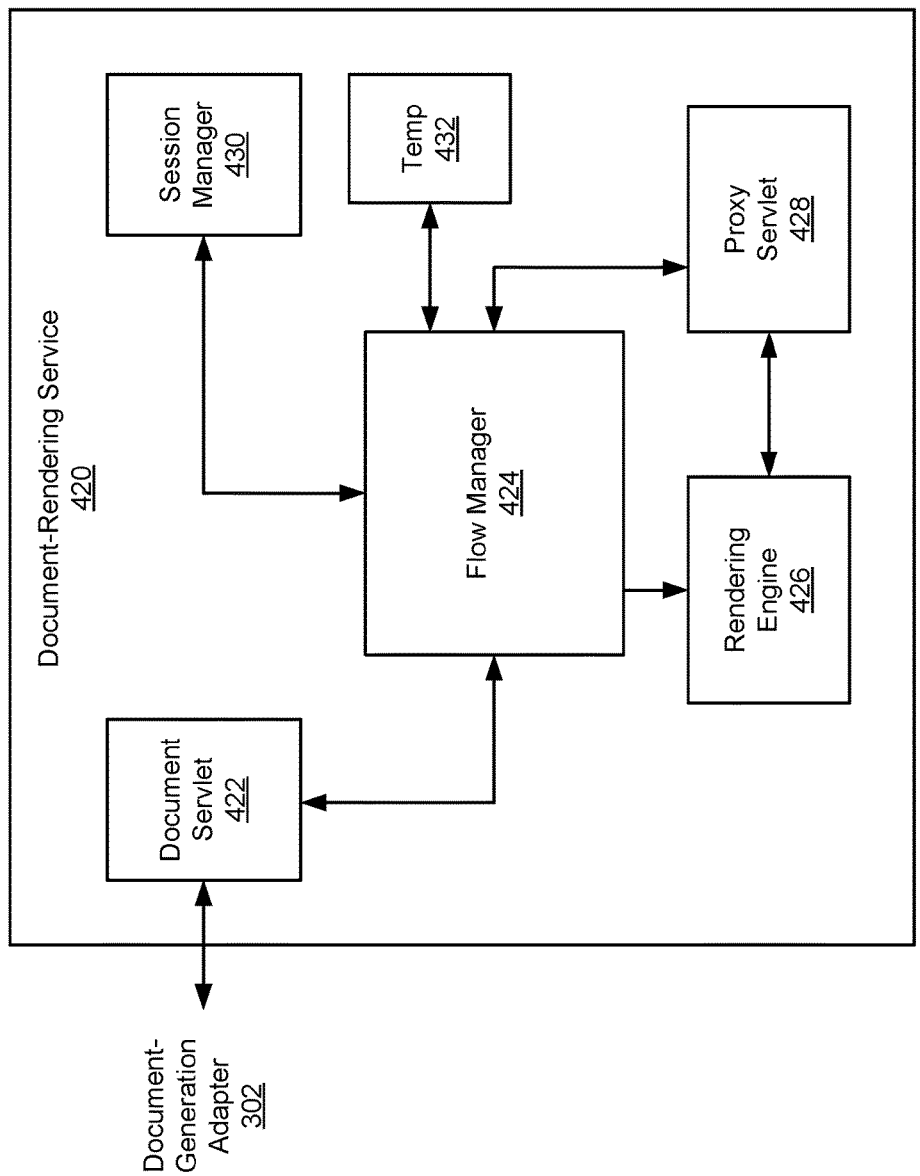
FIG. 4 shows a block diagram of an example of a document-rendering service for generating platform-independent documents for the document-generation adapter of FIG. 3 according to some implementations.

In some implementations, one or more of the application servers $100_1$-$100_N$ implement or host a document-rendering service. FIG. 4 shows a block diagram of an example of a document-rendering service 420 for generating platform-independent documents for the document-generation adapter 302 of FIG. 3 according to some implementations. In some implementations, the document-rendering service 420 is implemented in a different set of one or more of the application servers $100_1$-$100_N$ than the document-generation adapter 302 and the core application 300; that is, the document-generation adapter 302 and the core application 300 execute in different physical machines than the document-rendering service 420. For example, this can facilitate security features and the prevention of unauthorized access to sensitive or confidential data. The document-rendering service 420 includes a document servlet 422, a flow manager 424, a rendering engine 426, a proxy servlet 428, a session manager 430 and a temporary storage 432.

In some implementations, the rendering engine 426 is built on the WebKit® platform. In some such implementations, the rendering engine 426 is built on Qt WebKit (Qt WebKit is the port of WebKit built on the Qt cross-platform application framework). WebKit® is a software platform for rendering web pages and other structured documents in web browsers. For example, WebKit® has been used as the rendering engine in the Safari® web browser by Apple® and in the Chrome® web browser by Google®. WebKit® includes a C/C++ application programming interface (API) that provides a set of classes or libraries to display web content, and can implement browser features such as following links, managing a back-forward list, and managing a history of pages recently visited. The WebKit® platform includes WebCore, which is a layout, rendering, and Document Object Model (DOM) library, and JavaScriptCore, which is a framework that provides a JavaScript engine for WebKit®.

Using WebKit® as the platform for the rendering engine 426 can be desirable because it is the rendering engine upon which many generally available web browsers are based. Because of its application as a rendering engine for web browsers, WebKit® includes desirable capabilities such as the capabilities to render, read, understand, interpret and process (all used interchangeably herein where appropriate unless otherwise indicated) markup languages such as Extensible Markup Language (XML), HyperText Markup Language (HTML) including HTML5, and Extensible HTML (XHTML); style sheet languages such as Cascading Style Sheets (CSS) including CSS3; dynamic programming languages such as JavaScript; right-to-left (RTL) languages; and conventions such as Document Object Model (DOM).

Although some implementations of the rendering engine 426 described herein may utilize WebKit® as a framework, this disclosure is not limited to such WebKit®based implementations. On the contrary, other web browsing or rendering applications, including embedded (or "headless") browsers (that is, browsers that can execute in a server and which do not necessarily generate or provide a user interface) can be used to implement, or modified to implement, the rendering engine 426. At a high level, the document-generation adapter 302 drives overall interaction with the document-rendering service 420, including providing HTML or other markup language content (hereinafter referred to collectively simply as "HTML" although the implementations described herein are not limited to any particular version or release of HTML or HTML in general) as well as retrieved resources to the document-rendering service 420. In some implementations, the document-generation adapter 302 also enforces whitelisting policies, enforces same-origin policies, and limits access to the internals of the application servers 100$_1$-100$_N$. The document-rendering service 420 parses, for example, HTML content received from the core application 300 through the document-generation adapter 302 and, based on resources identified in the parsed HTML content, generates one or more requests for the identified resources including the locations of the resources (for example, uniform resource locators (URLs)). The generated requests are subsequently passed to the document-generation adapter 302, which ultimately retrieves approved resources. The document-generation adapter 302 then communicates the retrieved resources to the document-rendering service 420. The document-rendering service 420, and specifically the rendering engine 426, then generates a printable platform-independent version of the desired document requested by the user.

Figure 5:
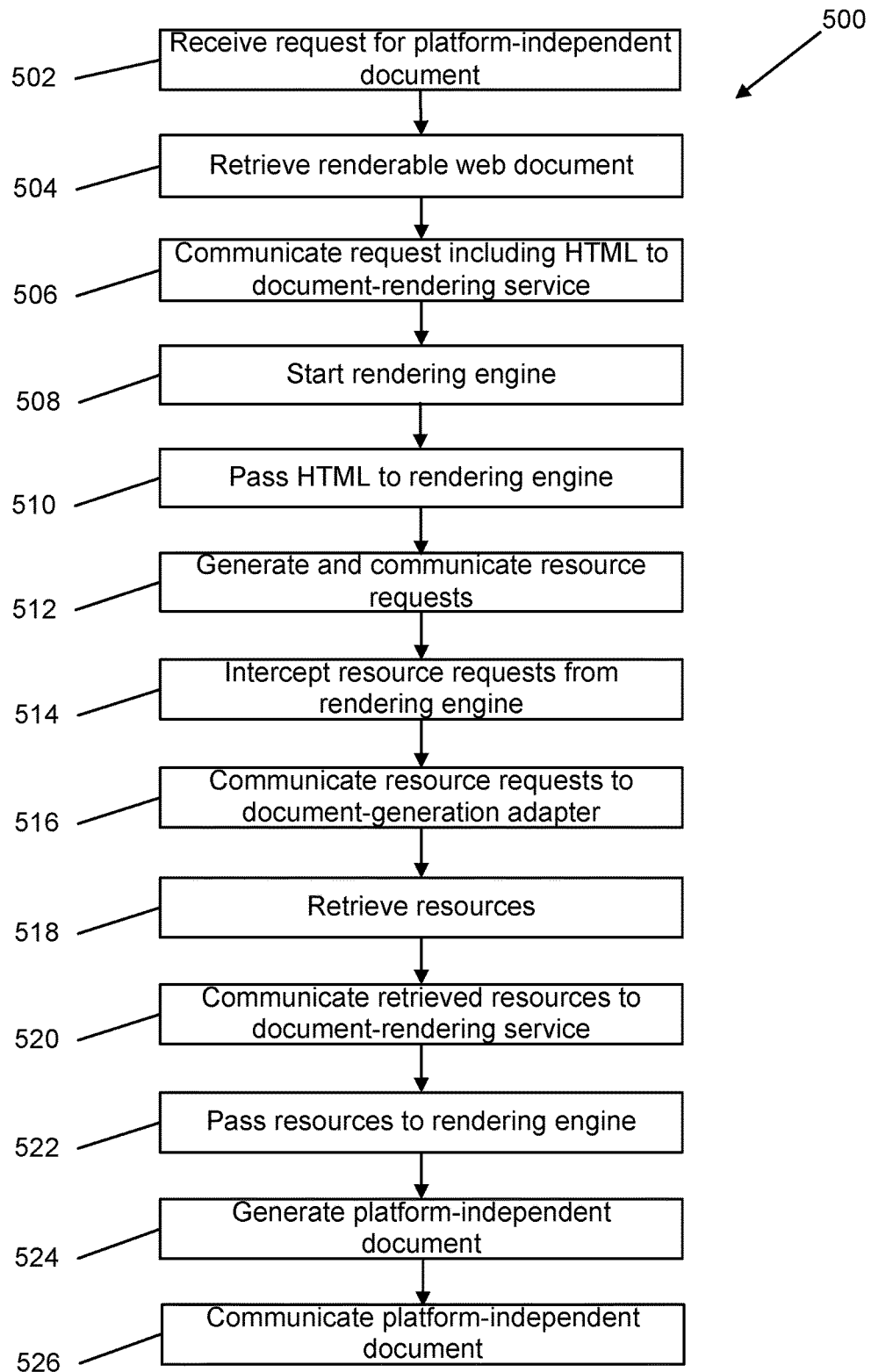
FIG. 5 shows a flowchart of an example of a computer-implemented method for providing a platform-independent document according to some implementations.

FIG. 5 shows a flowchart of an example of a computer-implemented method 500 for providing a platform-independent document according to some implementations. In some implementations, the method 500 begins in block 502 with the core application 300 receiving a request to provide a printable platform-independent version of a document to a user. As described above, the request can originate from a user's computing device 12, and specifically, a web browser executing within the user's computing device. Also as described above, the request can be generated in response to a user clicking or otherwise selecting a "print" UI element within an interface provided by the core application 300 to the user's computing device for display to the user. For example, referring back to the use case described above, one of the on-demand services that the core application 300 can provide is the ability to generate a document such as an invoice. The invoice can be provided to the user's computing device in a first format, for example, as a renderable web document (for example, an HTML structured document). Also as described above, the renderable web document also can include various CSS, JavaScript or other resources or links to such resources.

In some implementations, the renderable web document (such as the invoice described above) is not included with the request received in block 502. Rather, in some such implementations, the request received in block 502 identifies the renderable web document without providing the document. For example, the core application 300 doesn't need to receive the document from the user's computing device because the core application or other application within the database system 16 itself first generated the document and transmitted it to the user's computing device for rendering and display. For example, the core application 300 can in some implementations retrieve the renderable web document from its own temporary memory or from other storage (for example, tenant data storage 22 or system data storage 24) in response to the request in block 502.

In some implementations or instances in which the user edits or otherwise modifies the rendered document after receiving the renderable web document from the database system 16, the user's computing device (and specifically the web browser executing in the user's computing device) can send communications to the database system after each key stroke or after other user input (for example, a mouse click) is made by the user. In this way the core application 300 is made aware of the modifications. In some other implementations or instances in which the user edits or otherwise modifies the rendered document, the user's computing device can send the modifications to the core application 300 whenever the user clicks a "save" button or otherwise causes the core application 300 to save the modified version of the rendered document to the database system 16. In this way the core application 300 is made aware of the modifications. In some other implementations or instances in which the user edits or otherwise modifies the rendered document, the user's computing device can send the modifications to the core application 300 with the request identifying the document received in block 502. Again, in this way, the core application 300 is made aware of the modifications.

In block 504, the core application 300 retrieves the renderable web document, which generally includes HTML or other markup language code. The core application 300 provides the HTML to the interaction manager 304. The interaction manager 304 manages interactions with various other components of the document-generation adapter 302 as well as with the document-rendering service 420. In some implementations, the core application manager 300 removes any session or authentication cookie before communicating the HTML to the interaction manager (for example, such a session cookie can be transmitted to the user's computing device's browser when the user logs into the system 16 and subsequently transmitted with various requests sent by the user's computing device to the system 16 as a means of authenticating the requests). The interaction manager 304 subsequently communicates a request to the service interface 306 that includes the HTML received in block 504. As just described, the user's session cookie is not included in the request communicated in block 504. In some implementations in which the core application 300 does not remove the session cookie, the interaction manager 304 removes the session cookie. The service interface 306 communicates the request to the document-rendering service 420 in block 506. In some implementations, the service interface 306 transmits the request over an HTTPS link or other secure encrypted communication link to the document-rendering service 420.

The document servlet 422 receives the request communicated in block 506 and communicates the HTML for the renderable web document to the flow manager 424. In some implementations, the flow manager 424 stores the HTML in temporary storage 432. In block 508, the flow manager 424 starts the rendering engine 426 (or instantiates an instance of a rendering engine process 426). The rendering engine 426 subsequently sends a request for the HTML (for example, a request including the URL for the HTML). The proxy servlet 428 intercepts the request for the HTML sent by the rendering engine 426 and passes the request for the HTML to the flow manager 424, which then retrieves the HTML from the temporary storage 432. The flow manager 424 subsequently communicates the retrieved HTML in a response, which is received and passed by the proxy servlet 428 to the rendering engine 426 in block 510. The rendering engine 426 subsequently parses the received HTML. As described above, in some implementations or instances, the renderable web document often can include resources or identifiers (for example, uniform resource locators (URLs)) for such resources, such as image files, CSS files, JavaScript files, various scripts, or other content, some of which can be located within the database system 16 (for example, within tenant data storage 22 or system data storage 24) and some of which can be located in storage locations external to the database system 16 (such as from third party providers). In block 512, the rendering engine 426 generates and communicates requests for the resources identified in the parsed HTML. For example, the rendering engine 426 can generate Hypertext Transfer Protocol (HTTP) requests to obtain the requested resources (It should be noted that, in some implementations, resources retrieved by the web browser executing within the user's computing device are not sent back to the core application 300, or more generally the database system 16, in block 502 or at any other time). In some implementations, the rendering engine 426 packages some or all of the requested resources into one or more packaged resource requests. For example, the rendering engine 426 may package together resource requests for resources hosted by one particular provider (for example, GOOGLE) into one request that identifies two or more needed resources.

However, in some implementations, the requests generated and communicated from the rendering engine 426 itself do not directly leave the document-rendering service 420. In such implementations, in block 514, the proxy servlet 428 intercepts the requests generated and communicated from the rendering engine 426 in block 512. In some implementations, the proxy servlet 428 generates one or more lists of the resources requested by the rendering engine 426. The proxy servlet 428 communicates, in block 516, the intercepted resource requests or lists of intercepted resource requests (or requests based on such requests) to the flow manager 424 for subsequent communication to the document servlet 422, which ultimately communicates the requests to the document-generation adapter 302.

In some implementations, the communication connection between the proxy servlet 428 and the rendering engine 426 is an HTTPS link or other secure encrypted communication link, which allows requests to be sent from the rendering engine 426 to the proxy servlet 428, but not vice versa, and which allows replies (also referred to herein as "responses") to be sent from the proxy servlet 428 to the rendering engine 426, but not vice versa. In such a way, the rendering engine 426 is prevented from directly communicating outside of the proxy servlet 428, and more generally, outside of the document-rendering service 420. In some implementations, the document-rendering service 420 also includes an outbound firewall for preventing outbound requests sent from the rendering engine 426 in the case that the proxy servlet 428 failed to intercept them.

The service interface 306 (for example, an HTTP client) receives the resource requests communicated in block 516 and communicates the requests (or the resource locators (URLs)) included in the requests to the interaction manager 304. The interaction manager 304 communicates the resource locators in the requests to the content provider 308, which manages the retrieval of the requested resources in conjunction with policies-enforcement application 310 in block 518. In some implementations, block 518 can include one or more operations, steps, actions or determinations. For example, in some implementations, within block 518, the policies-enforcement application 310 enforces one or more whitelisting policies or same-origin policies on each request (for example, based on the requested URL), and limits access to resources within the internals of the application servers 100₁-100ₙ (for example, including those which must be purchased). Policies-enforcement application 310 approves or rejects the requested resources based on the whitelisting, same-origin or other policies or verification rules. In some implementations, the policies-enforcement application 310 rejects or terminates the requests that do not comply with one or more of the policies, and in some such implementations, communicate empty content responses back to the document-rendering service 420 and ultimately to the rendering engine 426. In some other such implementations, the policies-enforcement application 310 communicates some form of error response to the document-rendering service 420 and ultimately to the rendering engine 426.

Policies-enforcement application 310 requests approved externally-located resources (such as from third-party servers) through an external connection 312. However, certain approved resource requests can require authentication in block 518. For example, as earlier described, some of the resources requested by the rendering engine 426 may be publicly available while others, such as those located within the database system 16 (for example, in tenant data storage 22 or system data storage 24), require authentication before being provided. In other typical scenarios in which resource requests from a client-side web browser (as opposed to the cloud-based rendering engine 426) need to be authenticated, authentication can sometimes be achieved by way of a session cookie that is transmitted to the user's computing device when the user logs on to the cloud-based system. In such scenarios, the cookie can then be transmitted with every request for a resource sent by the user's web browser. Such a session cookie typically remains active for the duration of the user's session (for example, until the user logs off, until the user's web browser is closed, or until a predetermined duration of time has lapsed). But this session-cookie method of authentication may not be reliable or suitable for some implementations or applications. As such, in some implementations, no authentication information (such as a session cookie) is provided to the rendering engine 426 from, for example, the core application server 300 or any other element or component of the cloud-based system. In such implementations, to achieve authentication for those requested resources that require authentication, a different method is used.

In some implementations, within block 518, the policies enforcement application 310 determines which ones of the requested resources are publicly available. In some implementations, neither the policies enforcement application 310 nor the external connection 312 modifies information included with requests for publicly available resources. For example, some or all of the publicly available resources can be "whitelisted" by the policies enforcement application 310 and the requests for such whitelisted resources can subsequently be sent via the external connection 312 for retrieval. But for each of those resources that the policies enforcement application 310 determines require authentication, the policies enforcement application 310 determines whether authentication is allowed. For example, in the context of an implementation in which the user (for which the printable version of the document is being generated) is an employee or member of an organization, the policies enforcement application 310 can determine whether the request is for a resource owned by the organization or a resource to which access privileges have been granted to the organization. For example, such resources can be stored locally in the database system 16 in tenant storage 22.

In some implementations, to determine whether a resource request is allowed (or should be authenticated), the policies enforcement application 310 applies one or more verification rules to the request, including, for example and as described above, determining whether the resource is owned by or accessible to the user's organization (for example, by comparing an organization identifier that uniquely identifies the organization with a predetermined allowed resource list). As another example, another rule may require the policies enforcement application 310 to verify that the particular user owns or has been granted access privileges to the requested resource (for example, by comparing a user identifier that uniquely identifies the user with a predetermined allowed resource list). If the verification rules are satisfied, the policies enforcement application 310 or the internal connection 314 then attaches a cookie or other security token or authentication information to the resource request. The internal connection 314 then communicates the resource request for retrieval of the identified resource. Additionally, one or both of the external connection 312 and the internal connection 314 also can bundle or package groups of resource requests into one or more packaged resource requests for retrieval of the resources in block 518. Bundling resource requests into a single request or a reduced number of requests can make communication of the resources more efficient because the total number of round-trips needed to retrieve all of the requested resources can be reduced.

Resources retrieved in block 518 via responses received through the external connection 312 or the internal connection 314 are then communicated to the content provider 308 which then provides the resources back to the interaction manager 304. The policies enforcement application 310 or the interaction manager 304 removes any authentication or session cookies from the responses and resources. The interaction manager 304 communicates the retrieved resources to the service interface 306, which then communicates the retrieved resources to the document-rendering service 420 in block 520. In some implementations, the interaction manager 304 packages or bundles all or a subset of the retrieved requested resources (for example, those received within a predetermined duration of time) into, for example, a ZIP file before communicating the resources in block 520. Bundling resources into a single response or a reduced number of responses can make communication of the resources more efficient. Packaging the resources into a ZIP file also can be advantageous because the resources can be compressed. The document servlet 422 receives the retrieved resources sent in block 520 and subsequently communicates the retrieved resources to the flow manager 424, when then communicates them to the proxy servlet 428. The proxy servlet 428 passes the retrieved resources to the rendering engine 426 in block 522.

The rendering engine 426 subsequently generates the platform-independent document in block 524. More specifically, the rendering engine 426 first renders the earlier-received HTML (or other markup language code) and the retrieved resources, and subsequently prints, saves, or otherwise converts the rendered document to the platform-independent version of the document. For example, as described above, the rendering engine 426 may generate the platform-independent document as a PDF file or image file or other portable file format. In some implementations, the rendering engine 426 then communicates the platform-independent document to a specific address (for example, a URL) indicated in the initial response sent from the flow manager 424 and passed by the proxy servlet 428 to the rendering engine 426 in block 510. Again, the proxy servlet 428 intercepts the communication containing the platform-independent document and passes it to the flow manager 424. In some implementations, the flow manager 424 temporarily stores the platform-independent document in the temporary storage 428. When the flow manager 424 determines that the rendering engine 426 is finished rendering the platform-independent document, the flow manager 424 retrieves the platform-independent document from the temporary storage 428 and communicates the platform-independent document to the document servlet 422, which then communicates the platform-independent document to the document-generation adapter 302. In some implementations, the document-generation adapter 302 then communicates the platform-independent document to the core application 300 for transmission to the user's computing device in block 526.

It should be appreciated that some or all of the blocks of the method 500 may be repeated in some instances. For example, after a resource is received by the rendering engine 426 in block 522, the rendering engine then parses the resource. After parsing the resource, the rendering engine 426 may discover one or more other resources identified in the parsed resource. In such instances, the method 500 returns to block 512 with the rendering engine 426 generating and communicating requests for these additional newly identified resources. The repetition of blocks 512-522 can continue as long as there remain any resources that have yet to be requested and received by the rendering engine 426, for example, whether identified in the initial print request received in block 502 or identified in other received resources requested based on the initial print request.

Additionally, in some implementations in which the database system is a multi-tenant database system hosting and providing services to a plurality of organizations, the system, and more specifically the application servers 100 providing the document-rendering service 420, can host any suitable or appropriate number of parallel-executing or -executable rendering engine processes or instances 426, each of which is configured to generate a platform-independent document. In some implementations, the proxy servlet 428 also can include one or more parallel-executing or -executable proxy service processes or instances to intercept requests from the rendering engine processes. In some implementations, each request for a resource and each response including a received resource, whether sent by the rendering engine 426 or another element of the document-rendering service 420 or document-generation adapter 302, is tied to or identified with the respective user for which the resource was requested, and more generally, for which the platform-independent document is being provided. However, rather than attach the user's permanent unique identifier (identifying the user within the system 16) to the requests generated and communicated by the rendering engine 426 in block 512, the rendering engine 426 attaches a unique token to the request. Alternatively, the flow manager 424 can attach the token to the requests.

For example, in some implementations, between blocks 506 and 510, after the flow manager 424 receives the print request and HTML from the document servlet 422 and before the flow manager retrieves the HTML from the temporary storage 432 for passage to the rendering engine 426, the flow manager 424 requests a unique identity token (not to be confused with the authentication token or cookie described above that is not shared with the rendering engine 426 or with any other component of the document-rendering service 420) from the session manager 430. In such implementations, a purpose of this identity token can be to uniquely identify (and distinguish between) multiple page-rendering engine instances 426 that may or may not be executing at the same time. The unique identity token also can be used (for example, as a part of the session manager interface) to send requested resources back to the appropriate requesting page-rendering engine instance 426.

For example, in some implementations the session manager 430 records or stores the unique identity token (for example, a unique number) with the initial request received in block 506. This unique identity token can then be added to each subsequent request made by the rendering engine 426 in the preparation of the requested platform-independent document, including the initial HTML request sent from the rendering engine 426 after block 508 as well as the subsequent resource requests communicated in block 512. The unique identity token also can be included within every response received by the flow manager 424. For example, the retrieved resources communicated to the document servlet in block 520 can include the unique identity token. In implementations or instances in which the flow manager 424 is handling requests for a number of users and managing a number of rendering engines 426, the unique identity token informs the flow manager 424 which requests and responses are associated with which rendering engine and which user's platform-independent document. In this way, multiple parallel-executing rendering engines 426 can run and prepare platform-independent documents in parallel for a number of respective users.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for generating a platform-independent document comprising:
   a database system implemented using a server system comprising one or more hardware processors, the database system configurable to cause:
      processing a document request identifying markup language content;
      providing the markup language content to a rendering engine configured to: identify one or more resources in the markup language content, and communicate one or more resource requests for the one or more resources;
      processing the one or more resource requests as communicated by the rendering engine;
      retrieving the one or more resources;
      providing the one or more resources to the rendering engine, the rendering engine further configured to generate a platform-independent document based on the markup language content and the one or more resources; and
      communicating the platform-independent document to a computing device.

2. The system of claim 1, wherein the rendering engine uses the Webkit® platform.

3. The system of claim 1, wherein the platform-independent document is a Portable Document Format (PDF) file.

4. The system of claim 1, the database system further configurable to cause:
   generating a renderable web document comprising the markup language content;
   communicating the document request to a document-rendering service; and
   communicating the one or more resources to the document-rendering service.

5. The system of claim 4, the database system further configurable to cause:
   in response to receiving, from the document-rendering service, an internal resource request for an internal resource within the database system, generating a security token providing authentication for the resource.

6. The system of claim 5, the database system further configurable to cause:
   attaching the security token to the internal resource request;
   communicating the internal resource request; and
   removing the security token.

7. The system of claim 4, the database system further configurable to cause:
   in response to receiving, from the document-rendering service, an external resource request for an external resource outside of the database system, whitelisting the external resource request.

8. The system of claim 7, the database system further configurable to cause:
   communicating the whitelisted request to retrieve the external resource.

9. A computer-implemented method for generating a platform-independent document comprising:

processing a document request identifying markup language content;

providing the markup language content to a rendering engine configured to: identify one or more resources in the markup language content, and communicate one or more resource requests for the one or more resources;

processing the one or more resource requests as communicated by the rendering engine;

retrieving the one or more resources;

providing the one or more resources to the rendering engine, the rendering engine further configured to generate a platform-independent document based on the markup language content and the one or more resources; and communicating the platform-independent document to a computing device.

10. The method of claim 9, wherein the rendering engine uses the Webkit® platform.

11. The method of claim 9, wherein the platform-independent document is a Portable Document Format (PDF) file.

12. The method of claim 9, further comprising:

generating a renderable web document comprising the markup language content;

communicating the document request to a document-rendering service; and communicating the one or more resources to the document-rendering service.

13. The method of claim 12, further comprising:

in response to receiving, from the document-rendering service, an internal resource request for an internal resource within the database system, generating a security token providing authentication for the resource.

14. The method of claim 13, further comprising:

attaching the security token to the internal resource request;

communicating the internal resource request; and removing the security token.

15. A computer program product comprising computer-readable program code capable of being executed by one or more processors when retrieved from a non-transitory computer-readable medium, the program code comprising instructions configurable to cause:

processing a document request identifying markup language content;

providing the markup language content to a rendering engine configured to: identify one or more resources in the markup language content, and communicate one or more resource requests for the one or more resources;

processing the one or more resource requests as communicated by the rendering engine;

retrieving the one or more resources;

providing the one or more resources to the rendering engine, the rendering engine further configured to generate a platform-independent document based on the markup language content and the one or more resources; and communicating the platform-independent document to a computing device.

16. The computer program product of claim 15, wherein the rendering engine uses the Webkit® platform.

17. The computer program product of claim 15, wherein the platform-independent document is a Portable Document Format (PDF) file.

18. The computer program product of claim 15, the instructions further configurable to cause:

generating a renderable web document comprising the markup language content;

communicating the document request to a document-rendering service; and communicating the one or more resources to the document-rendering service.

19. The computer program product of claim 18, the instructions further configurable to cause:

in response to receiving, from the document-rendering service, an internal resource request for an internal resource within the database system, generating a security token providing authentication for the resource.

20. The computer program product of claim , the instructions further configurable to cause:

attaching the security token to the internal resource request;

communicating the internal resource request; and removing the security token.

* * * * *